Feb. 23, 1932. H. E. MERRITT 1,846,745
FRICTION CLUTCH DEVICE
Filed Sept. 16, 1929
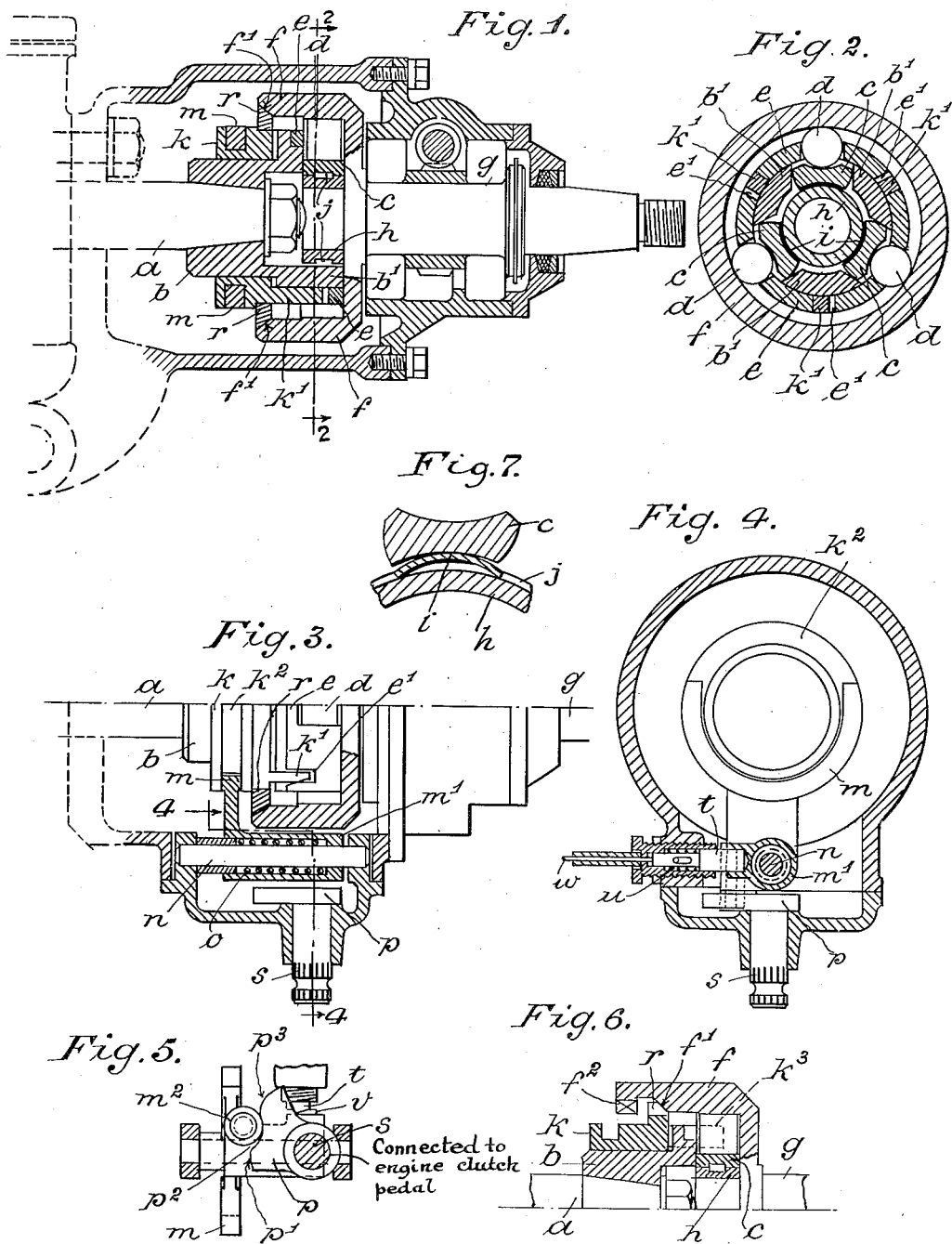
Inventor:
H. E. Merritt
by Monroe E. Miller Atty.

Patented Feb. 23, 1932

1,846,745

UNITED STATES PATENT OFFICE

HENRY EDWARD MERRITT, OF HUDDERSFIELD, ENGLAND

FRICTION CLUTCH DEVICE

Application filed September 16, 1929, Serial No. 393,011, and in Great Britain September 21, 1928.

My invention relates to friction clutch devices, and has for its object to provide an improved construction or device of this character which will be particularly suitable for use in connection with automobile transmission gear, in order to permit of free-wheeling and of the dis-connection of the gear box to facilitate easy gear changing.

The device is based on the well-known principle of a roller acting between two surfaces, one cylindrical and concentric with the driving and driven shafts and the other of inclined or cam profile. In one direction of rotation of one shaft relative to the other the roller automatically disengages and in the other direction it automatically binds the cylindrical and inclined surfaces with a self-locking action in which the frictional force is directly proportioned to the torque transmitted.

Clutches of the type referred to, as hitherto usually constructed, suffer from the disadvantage that, with the degree of accuracy of manufacture obtainable in commercial production, it is impossible for the load to be carried equally by all the rollers. As a result the stresses on individual rollers may be unduly high and the locating bearings may be subjected to excessive radial loads. A further objection is that the clutch cannot easily be locked for both directions of rotation, a condition essential for automobile transmission applications.

The present invention comprises a form of construction or arrangement which will overcome the objections mentioned and which will, in addition, afford an easy means of locking the clutch in both directions when desired.

A device according to the present invention is characterized and differentiated from the known constructions of friction clutch mechanism, in that the wedges or cam members are made separately from and are driven by a suitable cage or claw-shaped driving member secured to the driving shaft. The wedges are, on their inner sides, curved to bear on a central floating ring, and if three of such wedges are disposed at equal angular intervals all will be constrained to carry equal load and no radial load on the locating bearings is possible. It is not essential to use only three wedges if great accuracy of manufacture is possible, but this number is the only one which ensures automatically equal load distribution. The outer faces of the wedges are of inclined or cam formation and between these outer faces and the inner cylindrical surface of a drum formed on or secured to the driven shaft there are disposed rollers, which are located at the appropriate equal angular intervals by means of a cage formed with suitable slots. This roller cage is mounted to have permissible limited and controlled angular movement relative to the member driving the wedges.

In order that the device may be usefully employed on a motor vehicle as a free-wheel attachment to permit of coasting, provision is made for inter-connecting means, for controlling movements of the slotted roller cage, so as to connect or dis-connect the driven member to or from the driving member, with the clutch pedal of a vehicle, whereby on depression of the clutch pedal there is or may be first produced a synchronizing action on the driven member and later a driving connection between the driven member and the gear box of the vehicle, means being provided to enable the driving connection to be maintained when the clutch pedal is raised and to enable it to be released when desired, to re-institute the free-wheel action. The production of the synchronizing action mentioned need not, however, necessarily be provided for.

Referring to the accompanying drawings,

Fig. 1 shows a sectional elevation of a device embodying one form of the invention, Fig. 2 is a cross section on the line 2—2, Fig. 1;

Fig. 3 is a partial sectional plan view;

Fig. 4 is a sectional end view on the line 4—4, Fig. 3;

Fig. 5 is a detail showing the means whereby a control member, which may be connected to the clutch pedal of a vehicle is operative to control a clutch fork which in turn controls the slotted roller cage, and, if desired, produces also the synchronizing action on the driven member prior to connection of the latter to the gear box;

Fig. 6 is a detail showing a modification which may be adopted; and Fig. 7 is a fragmentary, sectional detail showing the nature and arrangement of the spring devices.

In the drawings, $a$ represents a driving shaft connected say to the gear box of a vehicle, and $b$ a member fast thereon and having three projections $b'$ with parallel slots between them. In these slots are placed three wedges $c$, the hardened and ground cam-shaped outer surfaces of which engage with rollers $d$, carried in a cage $e$ which is concentric with the claw member $b$. The rollers are adapted to be wedged by the action of the transmitted torque between the wedge pieces $c$ and the hardened and ground inner surface of a drum $f$, formed on or carried by a driven shaft $g$. The inner surfaces of the wedge pieces $c$ are curved to an appropriate radius to seat themselves upon a central floating annular ring $h$, a certain amount of radial clearance being provided which is taken up by flat springs $i$ disposed in grooves $j$ in the wedge pieces and in the floating ring $h$.

The operation of the rollers and wedges is as follows:—

When torque is applied to the claw member $b$, the pressure between the wedges, rollers and annulus $f$, occasioned by the springs $i$ causes the rollers to roll up the cam surfaces of the wedges and produce a self-locking action. The rollers are constrained to retain their equally-spaced position by means of the cage $e$ and to maintain equilibrium of the floating ring $h$ every roller must carry the same load.

A ring member $k$, slidable on the hub of the claw member $b$, has a series of projections or fingers $k'$ which are adapted to enter recesses $e'$ in the roller cage $e$ and, when so positioned, to limit the rotary movement of the cage in the direction which would carry the rollers into the reverse-drive position. When the projections or fingers $k'$ are withdrawn, the cage is free to move and the rollers and wedges will bind in either direction of rotation of the driving member $a$. The cage locking ring $k$ has an annular groove $k^2$ in which engages a clutch fork $m$ carried by a boss $m'$ slidable on a fixed spindle $n$. A coiled spring $o$ confined in a recess in the boss $m'$ of the clutch fork tends to move the cage locking ring to locking position, and a cam $p$ adapted to bear against a roller $m^2$ on the boss $m'$ (see Fig. 5) enables the locking ring to be moved to inoperative position. A synchronizing ring $r$ encircling and carried by the cage locking ring, is adapted to engage a surface $f'$ on the driven drum $f$ when the locking ring has been moved fully into operative position.

The cam $p$ is carried by a spindle $s$ which is operatively connected by suitable means, not shown, with a control member which may be the clutch pedal of the vehicle, and the said cam is so shaped that when the clutch pedal is raised a part $p'$ of the cam engages the roller $m^2$ and holds the clutch fork in a position in which the fingers $k'$ are engaged in the recesses of the roller cage and hold the latter locked in the free-wheel position, the synchronizer ring $r$ being at such time held clear of the co-operating surface $f'$ on the drum $f$. When the clutch pedal is depressed the cam first presents a concavity $p^2$ into which the roller can move, and the spring $o$ operates to bring the synchronizer ring into action, reducing thereby the speed of the driven member to that of the driving member, that is to say to the speed for the time being transmitted from the gear box. Further depression of the clutch pedal causes a part $p^3$ of the cam to engage the roller $m^2$ and to move the clutch fork to a position in which the fingers $k'$ are withdrawn clear of the recesses in the roller cage, the synchronizer ring being, of course, withdrawn as the clutch fork commences its withdrawing movement. Driving connection is thereby established between the driving and driven members, and as this connection is established when the engine clutch is disconnected, the shock of engagement is reduced to a minimum.

In order to maintain the driving connection when the clutch pedal is raised again, a non-return catch $t$ operated by a spring $u$ is provided to engage a projection $v$ on the clutch fork boss, and a Bowden cable or like connection $w$ is provided to enable the catch to be released. At any time, therefore, after driving connection has been established as above described, the "free-wheel" can be brought into operation by releasing the catch and permitting the spring $o$ to move the locking ring $k$ into operative position.

The means above described thus enable a driving connection to be established at will, the speed of the driven member to be reduced to that of the driving member; the driving and driven members to be rotatively connected when desired; and re-introduction of "free-wheel" action to be effected by operation of a Bowden cable or equivalent connection. At any engine speed the engine can be used as a brake, and this is effected solely through the action of the clutch pedal.

In an alternative arrangement the depression of the clutch pedal, instead of moving a locking ring as above described, may bring into action a dog clutch operative to lock the gear in a reverse direction.

Such an arrangement is illustrated in Fig. 6. The ring $k$ has no projecting fingers to enter recesses in the roller cage, and the synchronizing ring $r$ is notched or serrated to form one member of a dog clutch. The part $f$ is extended outwardly beyond the surface $f'$ and is provided with an overhanging notched flange $f^2$ to form the other member of a dog clutch. The ring $k$ is mounted to slide on a key on the hub $b$. In the mid position of the ring $k$, the synchronizing ring is clear of part $f$ and also clear of the notched flange $f^2$. A cam arrangement similar to that already described may be employed, the action of which first causes a braking action to be exerted on the driven member by the synchronizing ring and then causes the ring $f$ to move over into engagement with the notched flange to lock the gear in a reverse direction. A Bowden cable-controlled spring catch will be provided as before to permit of release of the dog clutch after the clutch pedal has been raised.

The description above given is that of a device for use on a motor vehicle with interconnection to the clutch pedal of the vehicle. The improved friction clutch mechanism may, however, be used in other directions. Furthermore, the wedge members employed need not necessarily, in such cases, be formed with dual cam or inclined surfaces making a re-entrant angle with each other as shown.

The requisite angular control movements of the roller cage need not necessarily be obtained in the manner above described, that is to say by means of what I have termed a locking ring.

Having thus described my invention, and in what manner the same is to be performed, what I claim as new and desire to secure by Letters Patent is:—

1. A friction clutch device comprising a driving shaft, a claw member mounted for rotation with said driving shaft and having a plurality of pockets therein, a series of wedge members carried in said pockets, an angularly adjustable cage concentric with the claw member, a driven shaft, an annular drum associated with the driven shaft, rollers carried by said cage and disposed between said wedge members and the annular drum, and a central floating ring against which said wedges are adapted to bear.

2. A friction clutch device comprising a driving shaft, a claw member mounted for rotation with said driving shaft and having a plurality of pockets therein, a series of wedge members carried in said pockets, an angularly adjustable cage concentric with the claw member, a driven shaft, an annular drum associated with the driven shaft, rollers carried by said cage and disposed between said wedge members and the annular drum, a central floating ring against which said wedges are adapted to bear, and means interconnected with a clutch pedal for effecting angular adjustment of said cage, whereby depression of the clutch pedal will cause the driving and driven shafts to be positively connected.

3. A friction clutch device comprising a driving shaft, a claw member mounted for rotation with said driving shaft and having a plurality of pockets therein, a series of wedge members carried in said pockets, an angularly adjustable cage concentric with the claw member, a driven shaft, an annular drum associated with the driven shaft, rollers carried by said cage and disposed between said wedge members and the annular drum, a central floating ring against which said wedges are adapted to bear, means interconnected with a clutch pedal for effecting angular adjustment of said cage, whereby depression of the clutch pedal will cause the driving and driven shafts to be connected, a ring carried by said claw member for locking the cage against angular movement, and a synchronizing ring mounted on said locking ring adapted to check the speed of the driving member before the driving and driven shafts are positively connected.

4. A friction clutch device comprising a driving shaft, a claw member mounted for rotation with said driving shaft and having a plurality of pockets therein, a series of wedge members carried in said pockets, an angularly adjustable cage concentric with said claw member, a driven shaft, an annular drum associated with the driven shaft, rollers carried by said cage and disposed between said wedge members and the annular drum, a central floating ring against which said wedges are adapted to bear, means interconnected with a clutch pedal for effecting angular adjustment of said cage, whereby depression of the clutch pedal will cause the driving and driven shafts to be positively connected, and means to maintain the driving connection where the clutch pedal is raised.

In testimony whereof I affix my signature.

HENRY EDWARD MERRITT.